United States Patent [19]

Isayev

[11] Patent Number: 5,283,114

[45] Date of Patent: * Feb. 1, 1994

[54] WHOLLY AROMATIC POLYESTER FIBER-REINFORCED POLYSTYRENE-POLY(PHENYLENE OXIDE) BLEND

[75] Inventor: Avraam I. Isayev, Akron, Ohio

[73] Assignee: Edison Polymer Innovation Corporation, Brecksville, Ohio

[ * ] Notice: The portion of the term of this patent subsequent to Apr. 9, 2008 has been disclaimed.

[21] Appl. No.: 691,349

[22] Filed: Apr. 25, 1991

[51] Int. Cl.$^5$ ............... B32B 5/08; B32B 27/02; B32B 27/04

[52] U.S. Cl. ............... 428/294; 428/303; 428/364; 428/480

[58] Field of Search ............... 428/294, 364, 480; 525/392, 397, 437

[56] References Cited

U.S. PATENT DOCUMENTS

| | | | |
|---|---|---|---|
| 4,460,735 | 7/1984 | Froix | 524/537 |
| 4,468,364 | 8/1984 | Ide | 264/176 R |
| 4,728,698 | 3/1988 | Isayev et al. | 525/439 |
| 4,820,568 | 4/1989 | Harpell et al. | 428/113 |
| 4,835,047 | 5/1989 | Isayev et al. | 428/294 |
| 5,006,402 | 4/1991 | Isayev | 428/294 |
| 5,008,314 | 4/1991 | Lee, Jr. | 524/143 |
| 5,043,400 | 8/1991 | Tsuruta et al. | 525/437 |
| 5,068,052 | 11/1991 | Watanabe et al. | 252/299.01 |

OTHER PUBLICATIONS

Cogswell, "The Processing Science of Thermoplastic Structural Components", Intern Polymer Processing (ASM), 157-165 (1987).

*Primary Examiner*—George F. Lesmes
*Assistant Examiner*—Christopher Brown
*Attorney, Agent, or Firm*—Oldham, Oldham & Wilson Co.

[57] ABSTRACT

Self-reinforced polymer composites of about 98-2% by weight of a mixture of polystyrene and poly(phenylene oxide) and about 2%-98% by weight of a melt processable wholly aromatic polyester which exhibit anisotropic properties in the melt phase. This wholly aromatic polyester is a liquid crystal polymer, or LCP. The composite contains predominantly unidirectionally oriented fibers primarily in the range of about 1 to 10 micrometers in diameter formed in situ, from the wholly aromatic polyester, distributed in a polymer matrix of the mixture. The polymer composites of this invention have high tensile strength, high modulus, satisfactory elongation, good impact strength, and good high temperature properties, especially at LCP amounts of 40% by weight and upwards.

8 Claims, 3 Drawing Sheets

WHOLLY AROMATIC POLYESTER FIBER-REINFORCED POLYSTYRENE-POLY(PHENYLENE OXIDE) BLEND

FIELD OF THE INVENTION

This invention relates to self-reinforced polymer composites and processes for making the same, and more particularly to novel self-reinforced polymer composites comprising polystyrene (PS) poly(phenylene oxide)(PPO) and a melt processable wholly aromatic polyester which serves as the reinforcing agent and to processes for making the same.

BACKGROUND ART

Fiber-reinforced polymer composites are well known and widely used. Polymers of improved strength and increased stiffness can be obtained by the use of an appropriate reinforcing fiber. Probably the most widely used reinforcing fibers are glass, carbon and polyamides such as aramid (or "Kevlar" which is a registered trademark of the E.I. du Pont de Nemours & Co., Wilmington, Del.).

The base polymers used in making reinforced polymer composites such as those described above include a wide range of thermoplastics, such as polystyrene and copolymers thereof, polyamides, polycarbonates, polyetherimide, polyether etherketone (PEEK) and polyesters such as polybutylene terephthalate. These polymers are thermoplastics and are either amorphous or semi-crystalline. They may be called flexible chain polymers, since individual monomer units in the polymer chain are free to rotate with respect to each other so that the polymer chain may assume a random shape. By way of illustration, F. N. Cogswell, *Intern Polymer Processing*, vol. 1, no. 4, pages 157–165 (1987) discloses carbon fiber reinforced PEEK.

More recently developed are self-reinforced polymer composites comprising long, continuous, predominantly unidirectionally oriented fibers of a melt processable wholly aromatic polyester in a matrix of a thermoplastic flexible chain polymer. Such polymer composites are described in commonly assigned, U.S. Pat. No. 4,728,938 of Avraam Isayev et al., issued Mar. 1, 1988. As described therein, the fibers of the wholly aromatic polyester, which may also be termed a thermotropic liquid crystal polymer (LCP) are long continuous fibers formed in situ by mixing the matrix of base polymer with the wholly aromatic polyester in a suitable mixing and extrusion apparatus, as for example, an extruder-static mixer setup, or a twin screw extruder. Polymer composites specifically disclosed therein are polycarbonate/LCP composites containing from 2 to 20 weight percent of LCP, and polyetherimide/LCP composites containing from 5 to 30 percent by weight of LCP.

U.S. Pat. No. 4,835,047 of Avraam Isayev (the inventor herein) et al describes composites of polyetherimide (PEI) and a wholly aromatic polyester or LCP, in which the LCP content varies from 40 to 95 percent by weight. PEI is an amorphous high performance thermoplastic polymer having a glass transition temperature of 215° C. The LCP is present in fibrous domains in a matrix of PEI. Mechanical properties of these composites in general are superior to those described in U.S. Pat. No. 4,728,938 cited supra. These composites of PEI and an LCP are also described in A. I. Isayev and S. Swaminathan, "Thermoplastic Fiber-Reinforced Composites Based on Liquid Crystalline Polymers," *Proceedings of the Third Annual Conference on Advanced Composites*, pages 259–267, Sep. 15–17, 1987, Detroit, Mich., published by ASM International.

U.S. Pat. No. 5,006,403 of Avraam Isayev (the inventor herein) describes composites of poly(phenylene oxide) (PPO) and a wholly aromatic polyester or LCP, in which the LCP content carries from about 2.5 to about 90% by weight, based on total polymer weight. The LCP is present in fibrous domains in a matrix of PPO. Mechanical properties of the composites in general are superior to those of the base polymers (PPO), especially at higher LCP loadings (about 50% by weight and higher).

DISCLOSURE OF THE INVENTION

Applicant has found that outstanding physical and mechanical properties are obtained in fiber-reinforced composites comprising a polystyrene-poly(phenylene oxide) blend and a wholly aromatic polyester, and which comprises reinforcing fibers formed in situ in a polymer matrix. The polystyrene and the poly(phenylene oxide), both of which are thermoplastic flexible chain polymers, may be supplied in the form of a blend, the description herein will be with particular reference to a process which employs such a blend and the self-reinforced polymer composite produced therefrom.

This invention provides self-reinforced polymer composites comprising (a) from about 2% to about 98% by weight, based on total polymer weight, a mixture of polystyrene, of poly(phenylene oxide) and (b) from about 98% to about 2% by weight, based on total polymer weight, of a melt processable wholly aromatic polyester, said polymer composite comprising predominantly unidirectionally oriented reinforcing fibers which are formed in situ in a polymer matrix. The amount of wholly aromatic polyester is preferably from about 50% to about 90% by weight, based on total polymer weight. Polymer composites of this invention are characterized as "self-reinforced" because the fibers are formed in situ rather than being added, as is the case with conventional fiber reinforcing materials such as glass and carbon. The LCP polymers are those well known aromatic polyesters such as those described in U.S. Pat. No. 4,728,938 and incorporated herein by reference.

BEST MODE FOR CARRYING OUT THE INVENTION

The required starting materials for preparing the novel polymer composites of this invention are polystyrene (PS), poly(phenylene oxide)(PPO) and a melt processable wholly aromatic polyester.

Novel polymer compositions according to this invention are prepared by mixing from about 2% to about 98% by weight of base polymer with from about 98% to about 2% by weight of a melt processable wholly aromatic polyester at a temperature at which both polymers are melt processable, extruding the resulting blend in the melt phase, cooling the blend, and recovering a polymer composite according to the invention.

The thermoplastic polymer blend useful in this invention is a blend of polystyrene (PS) and poly(phenylene oxide) (PPO). Such a blend is supplied by General Electric Company under the tradename "Noryl" 731. The pellets of all material preferably were vacuum dried at 110° C. overnight before being polyblended with LCP.

Polyblends of LCP with PS-PPO, denoting a blend of polystyrene and poly(phenylene oxide), may be expressed on a percentage (by weight) basis as follows, for example: 95/5 PS-PPO/LCP, 75/25 PPO-PS/LCP, 50/50 PS-PPO/LCP, 25/75 PS-PPO/LCP, and 10/90 PS-PPO/LCP. Blends can be made over the entire composition range from 0% LCP (i.e., 100% PS-PPO blend) to 100% LCP.

These polyblends give composites whose physical properties vary over wide ranges but whose viscosity is less than that of the pure PS-PPO blend. Impact strength improves dramatically as LCP concentration is increased from 40% to 60%, and compositions containing 60% or more of LCP have substantially the same impact strength as the pure LCP and can be made at considerably lower costs. Tensile strength and secant modulus (or tensile modulus) of PS-PPO/LCP blends increases over the whole concentration range of LCP.

The polyester starting materials are melt processable wholly aromatic polyesters such as those described in U.S. Pat. Nos. 3,991,014; 4,067,852; 4,083,829; 4,130,545; 4,161,470; 4,318,842 and 4,468,364 and in G. W. Calundann et al., "Anisotropic Polymers, Their Synthesis and Properties", reprinted from the Robert A. Welch Conferences on Chemical Research, XXVI Synthetic Polymers, Nov. 15-17, 1982, Houston, Tex., pp. 247–291. The melt processable or thermotropic polyester may also be described as a liquid crystal polymer (LCP) since it exhibits anisotropy even in the melt phase.

The wholly aromatic polyester must be matched or paired with the base polymer so that the two have overlapping processing temperatures. That is, the melting point of the wholly aromatic polyester must be within the melt processing temperature range of the base polymer. Also, the wholly aromatic polyester must have a viscosity lower than that of the base polymer under melt processing conditions (e.g., temperature and shear rate).

One series of particularly suitable polymer compositions or composites according to the present invention are those made from poly(phenylene oxides) as the base polymer and a wholly aromatic polyester thermotropic liquid crystal polymer having a melting point of about 275° C. and supplied by Celanese Research Company, Summit, N.J. under the designation "Vectra A950". This polymer is believed to consist essentially of about 25–30 mole percent of 6-oxy-2-naphthoyl moieties, as described for example in U.S. Pat. No. 4,161,470 and in example 4 of U.S. Pat. No. 4,468,364.

The amount of wholly aromatic polyester in the final product usually is from about 2% to about 98% by weight, preferably from about 5% to about 90%, most preferably from about 40% to about 90% by weight, based on the combined weight of the base polymer viz. PS-PPO blend and the wholly aromatic polyester.

By using an inexpensive high tonnage polymer to form a portion of the thermoplastic base polymer in the composite, applicant has achieved good mechanical properties at appreciably lower cost than is the case of composite of poly(phenylene oxide), which is a comparatively expensive thermoplastic, and a wholly aromatic polyester or LCP, as described in the above cited U.S. Pat. No. 5,006,403.

All percentages throughout the specification and claims are by weight unless the contrary is specifically stated.

The wholly aromatic polyester, or LCP, is preferably incompatible with the base polymer over the entire composition range from 0 to 100 percent LCP. Therefore, the two are present as separate phases in blends. When the percentage of wholly aromatic polyester is as specified above and suitable high strain mixing conditions are used, the wholly aromatic polyester is present in the form of long continuous fibers in a matrix of the base polymer. The term, "high strain mixing conditions" herein includes a combination of shear and elongation.

Surprisingly, fibers are formed during mixing of the polyester with the base polymers (i.e., PS-PPO), even at high polyester loadings. Fiber formation is observed over the entire composition range, although the morphology as observed under scanning electron microscope (SCM) changes as the amount of LCP is varied. Fiber formation is observed even at concentrations as low as 10% LCP by weight in the blend. The amount and density of the fibers increases with increase in LCP concentration. This accounts for increase in reinforcement and mechanical properties. At 25% LCP concentration, although segregation of skin and core (observed at higher LCP percentages) is absent, profuse fiber formation along with droplets presumably from the thermoplastic phase is observed at the edges of the sample. The inner regions of the sample are more uniform with short fibers imbedded in the thermoplastic matrix. As LCP concentration increases, the length of the fibers in the center (core region) increases while the fiber size decreases, and a different morphology is observed at the edges (skin region). At 60% LCP concentration in the blend, a uniform distribution of small fibers in a continuous matrix can be seen in the skin region. Long fibers in layers can be seen in the core region. Small droplets of the other phase can be seen sticking onto the fiber. A complete distinction between the skin and the core region occurs from a concentration of 60% LCP upwards. One can thus conclude that there is a phase separation because of the incompatibility of the polymers, and a phase inversion between the skin core regions appears to occur as the LCP concentration is increased. At high LCP percentages, it is not clear whether the LCP or the thermoplastic blend (PS-PPO) forms the fibers, but in any case reinforcing fibers are formed over the entire composition range, provided that proper mixing conditions are observed. More will be said subsequently about proper mixing conditions.

Additional materials are not required but may be present. Thus, it is within the scope of the invention to prepare a mixed composite polymer by inclusion of an additional reinforcing fiber, such as glass, carbon, or aramid, in addition to the wholly aromatic polyester. The additional reinforcing fiber may be incorporated into either the base polymer or the polyester. The additional reinforcement provided by the additional fiber is not necessary in most cases, but where a very high stiffness (or very high strength) reinforced polymer composite is desired, such can be attained according to the present invention without the high loadings of conventional reinforcing fiber required in presently known conventional polymer/fiber composites.

Other additives, such as pigments and fillers, coupling agents, flame retardants, lubricants, mold release agents, plasticizers and ultraviolet stabilizers, may be mixed with the base polymer and wholly aromatic polyester as desired. The use of such additives is well known in the polymer processing art.

The base polymer and the wholly aromatic polyester are mixed at ambient temperature to form a physical mixture. Any additional ingredients which are desired in the final product may also be mixed in at this time. The physical mixture is then dried under conventional conditions, e.g., at temperatures of about 100° C. to about 150° C. for approximately 6 to 24 hours, in a vacuum oven. The dry blended polymers (and additives, if any) are then thoroughly mixed at a temperature above the melting points of both polymers in a suitable mixing apparatus which will give thorough high strain mixing sufficient to cause fiber formation. The blend may be melt processed at a temperature within the range of about 250° C. to about 310° C.

The mixing apparatus may be, for example, a single screw extruder in series with a suitable static mixer. Other high shear mixing apparatus may also be used. The blend is then extruded in the form of a strand, which upon solidification, may be chopped into pellets.

Preferred mixing apparatus includes a twin screw extruder and extrusion die through which blends of the base polymer and the liquid crystal polymer are extruded. Alternatively, the mixing apparatus may include a single screw extruder, a static mixer and an extrusion die in that order. Good results have been obtained by using a co-rotation twin screw extruder (Werner and Pfleiderer, ZSK-30). This apparatus has 30 mm diameter co-rotating twin screws which are capable of rotating at speeds up to 500 rpm. Twin screw extruder used had five (5) independently controllably heating zones in series. Good results are also obtainable by using a single screw extruder having four (4) heating sections in series with a heated six-element Koch mixer (a static mixer), with an adapter between the extruder and the Koch mixer, and a discharge die having a 1/16 inch (in diameter) opening on the outlet side of the Koch mixer.

The processing temperature is the temperature at which both polymers are melt processable, i.e., a temperature at which the base polymer is either melted or sufficiently soft to be processed in ordinary mixing apparatus and at which the wholly aromatic polyester is above its melting point. The ingredients are brought up to processing temperature at the beginning of the mixing operation and are thereafter maintained in the desired temperature range. In the case of the preferred apparatus, the ingredients are brought up to temperature near the feed end of the single screw extruder and are thereafter maintained at appropriate processing temperature by appropriate controls of the various independently adjustable heating sections.

The product polymer composition or blend is a self-reinforced polymer composite in which one polymer is the matrix and the other polymer is at least partially in the form of predominantly unidirectionally oriented fibers or strands, oriented in the direction of extrusion. As indicated earlier, it is believed that the thermoplastic blend (PS-PPO) forms the matrix and the LCP forms the fibers at low or medium concentrations of LCP (e.g., up to about 60% LCP). Fiber diameters are predominantly less than 10 microns, primarily in the range of about 1 micron to about 10 microns, although fibers of other diameters can be obtained. Fiber diameter will vary with changes in LCP concentration, as earlier indicated. The polymer composite is characterized as self-reinforced because the fibers are formed in situ during the mixing process rather than being fed to the mixing apparatus as solid fibers. The proportions of ingredients in the polymer composite are essentially the same as in the feed.

The product polymer composite may be further processed as desired. For example, the polymer composite may be pelletized and then formed into shaped articles, tapes, films or fibers. This shaping may be accomplished by conventional means such as extrusion, injection molding, etc. Molded composite articles may be formed by injection molding. Films may be formed by conventional means such as melt extrusion or casting. Fibers may be formed by conventional melt spinning techniques. Polymer composites of this invention are especially suitable for injection molding.

Products of the present invention exhibit exceptional mechanical properties, including tensile modulus, tensile strength and notched Izod impact strength, particularly at higher LCP concentrations, e.g., at LCP concentrations ranging from about 40 to about 98% by weight and especially from about 50 to about 90% by weight. Secant modulus values are above the values which would be predicted from the Rule of Mixtures. The discussion of the Rule of Mixtures can be found in Lawrence E. Nielsen, "Mechanical Properties of Polymers and Composites," vol. 2, Marcel Dekker, Inc., New York 1974; pages 455 and 465 are of particular interest. Impact strength values are above those predicted by the Rule of Mixtures from about 50% LCP upwards and are quite desirable at such concentrations. Tensile strength values, while below those predicted by the Rule of Mixtures are nevertheless above those of the PS-PPO blend with no added LCP over the entire composition range and rise sharply as the LCP percentages increased from about 50%. Also surprising and unexpected is the fact that PS-PPO wholly/aromatic polyester blends of this invention are in the form of composites containing predominantly unidirectionally oriented fibers over the entire composition range.

Composites of the present invention are anisotropic. That is, they exhibit better tensile properties, e.g., higher secant modulus, higher tensile strength and greater elongation in the fiber or flow direction than they do in the transverse or cross direction. Tensile properties of composites of this invention are much improved over those of the unreinforced base polymer in the fiber direction. Differences in the cross direction are less notable.

Polymer composites of this invention are also characterized by high heat resistance and good electrical properties which remain stable over a wide range of temperatures and frequencies. Polymer composites of this invention also have good flame resistance.

Polymer composites of this invention are especially useful in high performance applications where high tensile strength, high modulus and good impact resistance are required or at least highly desirable. These products are particularly useful in various electrical, electronics, aerospace and automotive applications. In particular, polymer composites of this invention are useful in automotive and aerospace applications as replacements for present composite components which are produced by sheet molding compound technology. Products of this invention can be produced at faster rates and with less power consumption, resulting in lower product costs, compared to conventional composites in which fibers are prepared in advance. The additional step involving fiber preparation, the cost of machinery and the time required to prepare fibers are avoided.

Self-reinforced polymer compositions having a high degree of toughness (which is measured by the Izod impact test) can be obtained. Polymer composites of this invention are appreciably tougher than the corresponding base polymer.

This invention will now be further described in detail with reference to the specific examples that follows. It will be understood that these examples are by way of illustration of the invention and not by way of limitation of the scope thereof.

The thermoplastic base polymer used in the examples was a blend of polystyrene and poly(phenylene oxide) supplied by General Electric Company, Schenectady, N.Y., under the designation "Noryl" 731.

The melt processable wholly aromatic polyester used in the examples was a thermotropic polymer supplied by the Celanese Research Company, Summit, N.J. under the designation "Vectra A950". This polymer has a melting point of 275° C. and is believed to consist essentially of about 25-30 mole percent of 6-oxy-2-naphthyl moieties and 70-75 mole percent of p-oxybenzoyl moieties.

EXAMPLE 1

Mixtures of polystyrene-poly(phenylene oxide) blend (PS-PPO) and wholly aromatic polyester ("Vectra A950")(LCP) were prepared by dry mixing pellets of the two polymers at ambient temperature to form a physical mixture, and drying this mixture at 100° C. for 24 hours in a vacuum oven. Compositions ranged from 100 percent PS-PPO to 100 percent LCP. (Blends ranged in composition from 5% to 90% LCP by weight.) The dried and blended pellets were fed to a mixing apparatus comprising, in series from inlet to outlet, a co-rotating twin screw extruder (Werner and Pfleiderer, Ramsey, N.J., model ZSK-30), rotating at 140 rpm, as described above. All zones of the twin screw extruder were operated at the same temperature, i.e., 275° C., and a 1/16 inch (in diameter) discharge die, with a transition section between the extruder and the die. As the blend exited the static mixer, it was cooled in a room temperature water bath located just after the exit region. The solidified extrudate was cut into pellets approximately 4 mm in length with a pelletizer.

These pellets were then fed to a BOY 15S reciprocating screw injection molding machine with a maximum shot size of 36 cm³. The following process conditions were used for molding:

| | |
|---|---|
| Barrel temperature All Zones | 275° C. |
| Mold temperature | 120° C. |
| Injection pressure | 2000 psi |
| Injection time | 1 sec. |
| Screw speed | 250 rpm |

Samples of the injection molded blends described herein were observed in a Scanning Electron Microscope (SEM) model ISI-SX-40 (International Scientific Instruments) and were found to be in the form of fibers of predominantly 1 to 10 microns in diameter. These fibers were oriented essentially in the direction of molding, were well distributed across the surface of the material, and were nearly continuous in length.

Injection molded samples of each polymer blend were subjected to impact and stress-strain tensile tests.

Impact tests were carried out according to ASTM method D 235 C, using dumbbell shaped samples (standard tensile bars) 6.3 cm in length and having notches 0.125 inch (about 0.32 cm) in width, and using 2.0 lb and 5.0 lb. pendulums.

Tensile properties, i.e., secant (or tensile modulus (in gigapascals, or GPa), tensile strength (in megapascals, or MPa) and elongation to break (percentage based on original length) were measured on a Monsanto tensile tester (Model T-500) with a crosshead speed of 5 mm/min. The test specimens were mini-tensile bars. The tensile modulus was measured at 1% strain and tensile strength was measured at maximum stress.

Results are given in FIGS. 1-3 below. The physical properties of these blends are graphed and shown as the graphs of the figures.

Figure 1:
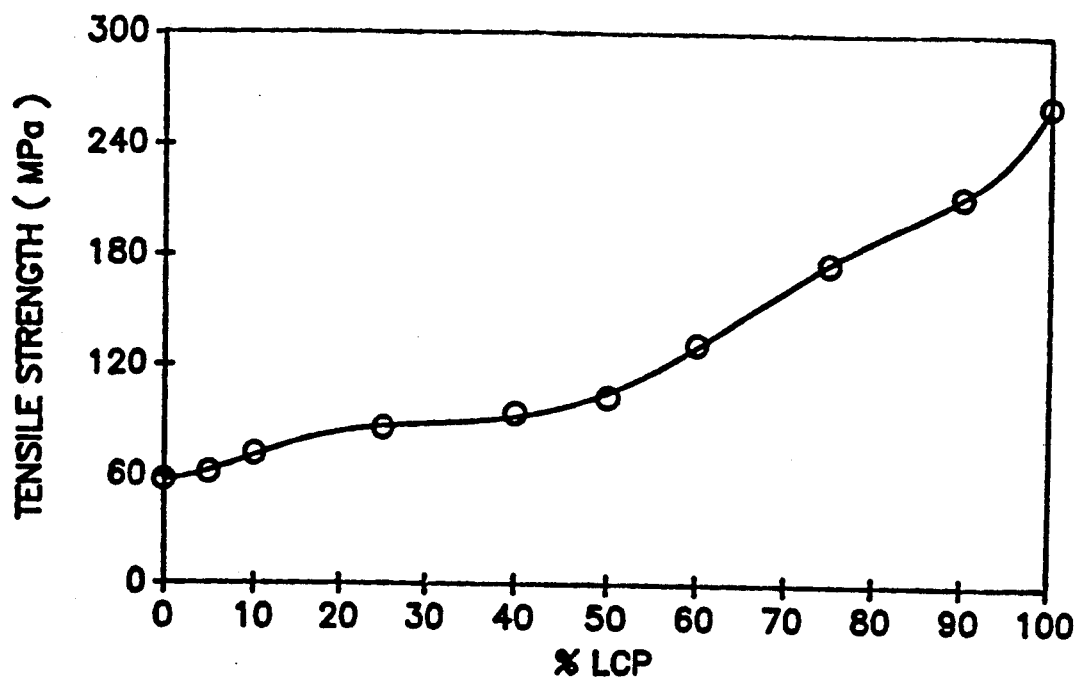
FIG. 1 is a graph of tensile strength as a function of composition for PS-PPO/LCP blends obtained using a tensile tester.
Figure 2:
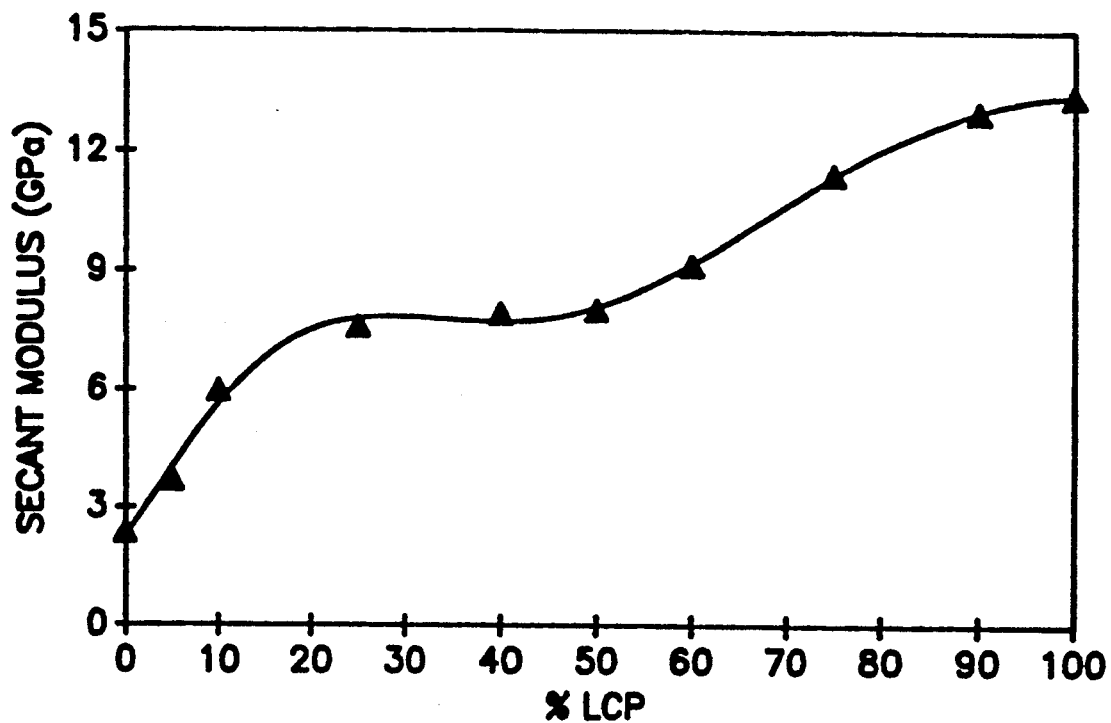
FIG. 2 is a graph of secant modulus as a function of LCP composition for PS-PPO/LCP blends obtained using a tensile tester.
Figure 3:
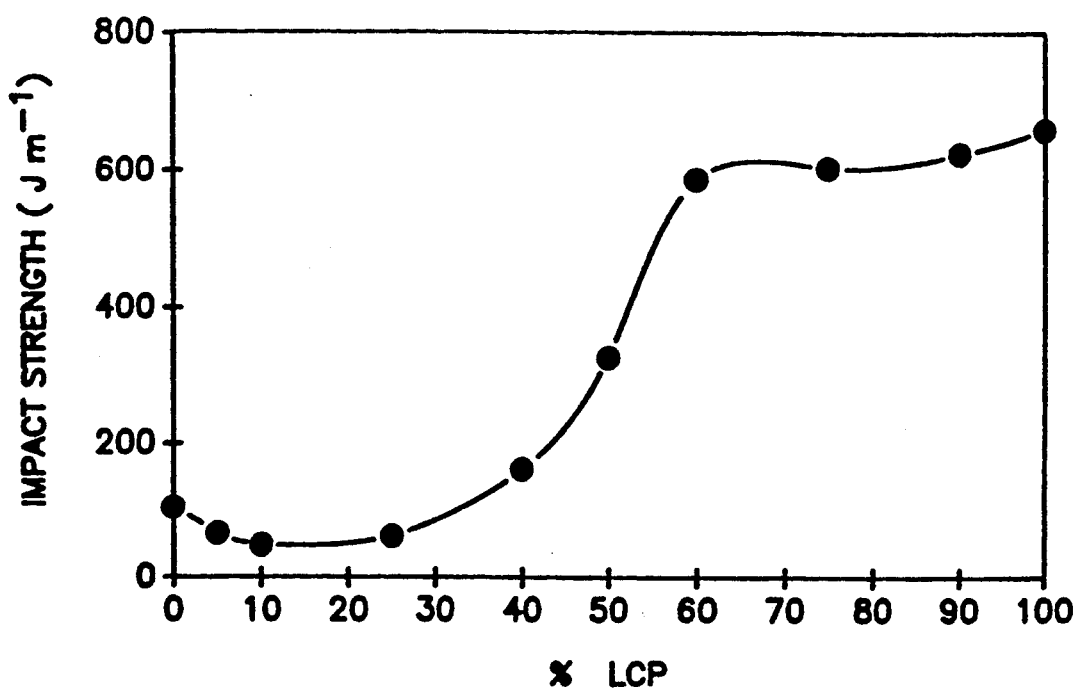
FIG. 3 is a graph of notched Izod impact strength as a function of LCP composition for PS-PPO/LCP blends obtained using an Izod impact tester.

While in accordance with the patent statutes, a preferred embodiment and best mode has been presented, the scope of the invention is not limited thereto, but rather is measured by the scope of the attached claims.

I claim:

1. A self-reinforced polymer composite comprising:
   (a) from about 98% to about 2% by weight, based on total polymer weight, of a mixture of polystyrene and poly(phenyleneoxide), and
   (b) from about 2% to about 98% by weight, based on total polymer weight, of a melt processable wholly aromatic polyester;
   said mixture of polystyrene and poly(phenyleneoxide) and said wholly aromatic polyester having a temperature range in which both are melt processable;
   said wholly aromatic polyester having a viscosity lower than that of said mixture of polystyrene and poly(phenyleneoxide) under melt processing conditions;
   said polymer composite having a greater tensile strength and a greater secant modulus in the fiber direction over the entire composition range than the tensile strength and the secant modulus of said mixture of polystyrene and poly(phenyleneoxide) containing no wholly aromatic polyester;
   said polymer composite comprising long continuous predominantly unidirectionally oriented reinforcing fibers of said wholly aromatic polyester which are formed in situ in a polymer matrix of said mixture of polystyrene and poly(phenylene oxide).

2. A polymer composite according to claim 1 comprising from about 60% to about 10% by weight of said polystyrene-poly(phenylene oxide) mixture and from about 40% to about 90% by weight of said wholly aromatic polyester, based on total polymer weight.

3. A molded composite article formed from the polymer composite of claim 1.

4. A fiber which has been melt spun from the polymer composite of claim 1.

5. A film or tape formed from the polymer composite of claim 1.

6. A self-reinforced polymer composite according to claim 1, wherein said composite is formed in a process which includes subjecting a melt of said mixture of polystyrene and poly(phenylene oxide) and said wholly aromatic polyester to high strain mixing conditions at a temperature at which both polymers are melt processable.

7. A self-reinforced polymer composite according to claim 1, in which the fiber diameters are predominantly less than 10 microns.

8. A self-reinforced polymer composite according to claim 1 in which the tensile strength and the secant modulus are greater in the fiber direction than in the transverse direction.

* * * * *